United States Patent Office 3,517,017
Patented June 23, 1970

3,517,017
BORON-CONTAINING SALTS OF 2-MERCAPTO-PYRIDINE-N-OXIDES
Rudiger D. Haugwitz, New Haven, Conn., assignor to Olin Mathieson Chemical Corporation, New Haven, Conn., a corporation of Virginia
No Drawing. Filed Mar. 6, 1969, Ser. No. 804,995
Int. Cl. C07d *31/50*
U.S. Cl. 260—294.8          3 Claims

ABSTRACT OF THE DISCLOSURE

Boron-containing salts of 2-mercaptopyridine-N-oxides having the formula

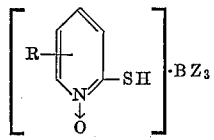

wherein R is hydrogen, halogen, alkyl or alkoxy and Z is halogen, alkyl or aryl are described. These salts, which are useful biocides, are prepared by reacting the appropriate trisubstituted boron compound with a 2-mercaptopyridine-N-oxide.

---

This invention relates to selected boron-containing salts of 2-mercaptopyridine-N-oxides having utility as biocides. More particularly, this invention relates to salts having the formula

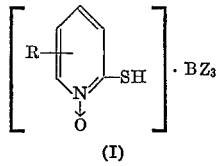

(I)

wherein R is hydrogen, halogen, alkyl or alkoxy and Z is halogen, alkyl or aryl.

Various 2-mercaptopyridine-N-oxides have been previously prepared and disclosed in the literature. Thus, U.S. Pat. 2,686,786 discloses 2-mercaptopyridine-N-oxide and lower alkyl, lower alkoxy and halo substituted 2-mercaptopyridine-N-oxides. While such compounds have found widespread usage, they are disadvantageous in certain applications because of a tendency to decompose after prolonged exposure to light.

Mixtures of 2-mercaptopyridine-N-oxides and soluble borates have also been previously disclosed, for example, as described in U.S. Pat. 2,909,459. However, the use of such mixtures as preservatives necessitates preparation of a physical mixture or a three component solution; it is readily apparent that the aforementioned steps complicate the use of the mixtures in industrial applications.

Now it has been found that stable, boron-containing salts having the Formula I can be readily provided in accordance with this invention. These salts exhibit excellent activity against a wide variety of microorganisms and thus have many valuable industrial applications.

The boron-containing salts (I) of this invention are provided by reacting a selected 2-mercaptopyridine-N-oxide with a trisubstituted boron compound and recovering the desired salt. Typical 2-mercaptopyridine-N-oxides suitable for use in the preparation of these salts (I) are fully described in U.S. 2,686,786 and have the formula

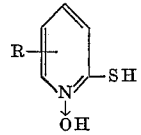

wherein R is hydrogen, halogen, lower alkyl, i.e., alkyl having 1–4 carbon atoms, or lower alkoxy, i.e., alkoxy having 1–4 carbon atoms, and Z is halogen, lower alkyl, i.e., alkyl having 1–4 carbon atoms, or phenyl. Illustrative of these 2-mercaptopyridine-N-oxides are 3-methyl-2-mercaptopyridine-N-oxide, 5-tert - butyl-2-mercaptopyridine-N-oxide, 4-methoxy - 2 - mercaptopyridine-N-oxide, 3-n-butoxy - 2 - mercaptopyridine-N-oxide, 5-bromo-2-mercaptopyridine-N-oxide, 3-fluoro - 2 - mercaptopyridine-N-oxide, 4-iodo-2-mercaptopyridine-N-oxide and 5-chloro-2-mercaptopyridine-N-oxide. Preferably, the unsubstituted 2-mercaptopyridine-N-oxide is employed.

It will be apparent to those skilled in the art that the 2-mercaptopyridine-N-oxides employed in this invention exist in tautomeric equilibrium with their corresponding 1-hydroxy-2-pyridinethiones as illustrated by the following formula

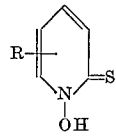

It is intended that both tautomeric forms are included in the nomenclature and formulas employed in the specification and claims herein.

The trisubstituted boron compounds having the formula $BZ_3$ which are used as reactants in the preparation of the salts of this invention are those wherein Z is halogen, lower alkyl, i.e., alkyl having 1–4 carbon atoms, or phenyl. Representative trisubstituted boron compounds include boron trifluoride, boron trichloride, boron tribromide, boron triiodide, trimethyl borane, tributyl borane, triphenyl borane, and the like.

The boron-containing salts having the Formula I are readily prepared by admixing the appropriate reactants at a temperature ranging from 0° to 50° C., and preferably at room temperature. While stoichiometric quantities are preferably employed, a molar excess of the trisubstituted boron compound can be suitably utilized.

The reaction is preferably carried out in the presence of an aprotic organic solvent, such as ethyl ether, benzene, toluene, xylene, methylene chloride, butylene ether, etc. The desired boron-containing salts (I) are obtained in high yield and excellent purity and are readily isolated by conventional techniques such as filtration, etc.

The antimicrobial and antifungal properties of the boron-containing salts (I) of this invention render them extremely attractive biocides. For example, they can be utilized as biocides for liquid hydrocarbon fuels, particularly for aviation applications. Thus, the boron trifluoride salt of 2-mercaptopyridine-N-oxide was an effective biocide for a conventional No. 2 fuel oil when employed in a concentration of 5 p.p.m.

Other areas where the boron-containing salts (I) of this invention are employed as biocides include paints, particularly water-based paints, and textiles.

The following example will serve to illustrate the preparation of the boron-containing salts (I) of this invention.

EXAMPLE

A solution of 6 g. of 50% boron trifluoride etherate dissolved in 100 ml. of ethyl ether was added at room temperature to a solution of 3 g. of 2-mercaptopyridine-N-oxide in 100 ml. of ethyl ether. A precipitate separated from the reaction solution shortly after completion of the addition. Filtration provided a solid product which was washer with ethyl ether to yield 3.1 g. of the boron-trifluoride salt of 2-mercaptopyridine - N - oxide, M.P. 90° C.

*Analysis.*—Calc'd for $C_5H_5NOS \cdot BF_3$ (percent): C, 30.80; H, 2.59; N, 7.18. Found (percent): C, 31.07; H, 2.63; N, 7.20.

The following in vitro spectrum of the borontrifluoride salt of 2-mercaptopyridine-N-oxide illustrates the antibacterial and antifungal activity of this compound; the minimal inhibitory concentration is given in parts per million.

TABLE

| Organism: | MIC |
|---|---|
| Bacteria— | |
|     *Streptococcus faecalis* | 1.5 |
|     *Pseudomonas aeruginosa* | 12.5 |
|     *Salmonella schottmülleri* | 2.5 |
|     *Staphylococcus aureus* | 1.5 |
|     *Aerobacter aerogenes* | 3.1 |
|     *Proteus vulgaris* | 3.1 |
|     *Klebsiella pneumoniae* | 1.5 |
|     *Escherichia coli* | <1.5 |
|     *Lactobacillus casei* | 4.5 |
| Fungi— | |
|     *Asperigillus flavus* | 4.5 |
|     *Asperigillus niger* | 4.5 |
|     *Pencillium notatum* | <1.5 |
|     *Saccharomyces cerevisiae* | 18 |

What is claimed is:

1. A boron-containing salt of a 2-mercaptopyridine-N-oxide, said salt having the formula

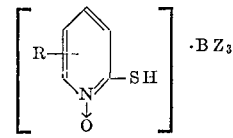

wherein R is hydrogen, halogen, lower alkyl or lower alkoxy and Z is halogen, lower alkyl or phenyl.

2. The boron-containing salt of claim 1 wherein R is hydrogen and Z is halogen.

3. The boron-containing salt of claim 2 wherein Z is fluorine.

References Cited
UNITED STATES PATENTS

| | | | |
|---|---|---|---|
| 2,607,776 | 8/1952 | Vinton | 260—294.8 |
| 2,909,459 | 10/1959 | Hovey | 424—263 |

ALAN L. ROTMAN, Primary Examiner

U.S. Cl. X.R.

424—263